Patented Jan. 19, 1954

2,666,717

UNITED STATES PATENT OFFICE 2,666,717

PATENT LEATHER AND COATING COMPOSITION FOR USE IN MAKING SAME

Salimuzzaman Siddiqui and Digish Chandra Dhar, Delhi, India, assignors to Council of Scientific and Industrial Research, New Delhi, India No Drawing. Application August 10, 1948, Serial No. 43,553

2 Claims. (Cl. 117—86)

This invention relates to compositions particularly suited for the manufacture of patent leather and to the patent leather prepared by using them.

The term "patent leather," also sometimes known as "japanned leather" or "enamelled leather," as originally used applied to leathers finished essentially with linseed oil varnishes. Usually, chrome-tanned leather is employed for the purpose of making enamelled leather. The processes involved in the manufacture of these types of leather are very tedious and are zealously guarded as trade secrets. The number of varnish coats applied and their compositions differ from product to product and from factory to factory. Smooth japans often receive as many as six or seven coatings. Some tanners shorten the process by applying suitable lacquers over the first or daub coat or over the second coat. In any case the linseed oil varnishes in the final coatings are nowadays replaced to some extent by lacquers. Lately this practice has become so prevalent that in the so-called "fast coating finishes" the finely ground pigmentary-dye lacquers do not contain any resins or gums. In almost all cellulose leather finishes resins and gums are used only to a very limited extent. In certain cellulose leather finishes, resins such as dewaxed dammar or elemi or "Albertol" (trade name) with a trifle of Venetian turpentine and acrylic resin are added in proportions up to 25% of the cellulose content, but these do not appear to have met with particular success.

Among the chief difficulties encountered with lacquers for finishing leathers have been (a) lack of adhesion to the leather, with consequent peeling and (b) absorption of the plasticisers by the leather, leaving the film very hard and incapable of contraction or expansion in use under changing conditions of atmospheric humidity and temperature.

The object of the present invention is to overcome the above-mentioned drawbacks and to formulate a suitable and economical composition which can be made from easily available and, as far as possible, indigenous ingredients.

The present invention for the preparation of a composition particularly suited for the manufacture of patent leather consists in preparing oil resin according to the process described in the specification of our Indian application, No. 38,064, now Indian patent, No. 38,064, and dissolving the said oil resin, along with film scraps, in butyl acetate and solvent naphtha. As described in said Indian patent the oil resin in question is prepared from bhilawan shell liquid by co-polymerizing the liquid with vegetable oils and with an oleo-resinous material, selected from a class consisting of rosin and turpentine, by treatment with nitric acid within the temperature range of from about 40° to 50° C. Bhilawan shell liquid can be obtained from bhilawan nuts as described in Indian Patent No. 32,237. As therein disclosed this liquid has been established as consisting mainly of a catechol derivative with a $C_{15}H_{27}$ side chain in the 3-position which has been named bhilawanol. Other components of bhilawan shell liquid are a small percentage of a monophenolic constituent named semi-carpol and a product of polymerization and condensation of bhilawanol.

In respect of successive coatings, variations may be made in the ingredients as illustrated by the following formulae:

The proportions of constituents are by weight. The proportions given below are merely illustrative and may be varied within a range of about 5 parts more or less, this applying, of course, only to the major components of the compositions.

*First formula:* (first coating)

| | Parts |
|---|---|
| Butyl acetate | 35 |
| Butanol or fusel oil | 15 |
| Methanol | 15 |
| Solvent naphtha | 10 |
| Turpentine | 10 |
| Total | 85 |
| Film scraps | 6 |
| Oil resin | 14 |
| Dibutyl phthalate | 4 |

*Second formula:* (second coating)

| | Parts |
|---|---|
| Butyl acetate | 35 |
| Butanol or fusel oil | 15 |
| Methanol | 15 |
| Turpentine | 35 |
| Solvent naphtha | 10 |
| Total | 110 |
| Film scraps | 3 |
| Oil resin | 7 |
| Bhilawan enamel | 5 |
| Dibutyl phthalate | 2 |
| Castor oil | 5 |

*Third formula: (third coating)*

| | Parts |
|---|---|
| Butyl acetate | 27 |
| Butanol or fusel oil | 23 |
| Methanol | 15 |
| Solvent naphtha | 10 |
| Acetone | 10 |
| Total | 85 |
| Film scraps | 4 |
| Dibutyl phthalate | 2 |

It is a well-known fact that large quantities of cinematographic films, which are definitely cheaper than the usual graded solution of cellulose nitrate or cellulose esters, are available at nominal prices. Hence these films are preferably made use of in the present invention.

Lacquer without resin has hitherto been a costly composition. An important feature of the present invention is the use of a comparatively larger quantity of resin which besides bringing down the price of the ultimate product, imparts flexibility to the leather and fulfils the important requirement of anchorage or adhesion and also gives body to the lacquer.

Lacquers in the trade for application to leather contain higher proportions of active organic solvents and little or no resin whereas in the first formula above it will be noticed that a highly concentrated solution has been evolved with considerable saving in solvents. All the solvents used in this process are readily available at commercial prices. Oil of turpentine was first used by Field in 1890 but it is not a common ingredient in the lacquers made hitherto. Its presence in this composition has been found to increase the flow of the lacquer and also to improve the gloss of the film.

The difficulty of procuring finely ground pigments suitable for use in these finishes has been a severe handicap for the leather dresser. Commercial pigments used in paints are too coarse to be employed in these compositions. This handicap is completely eliminated in the compositions described in the present invention, since no pigment is used to impart colour to the finished leather. Instead, a small quantity of bhilawan enamel, as shown in the above formulae, is used for obtaining a fine glossy jet black film.

Bhilawan enamel is obtained by dissolving bhilawan resin in a suitable hydrocarbon, such as white spirit or turpentine, as described in the Indian Patents Nos. 28,004 and 28,005. The bhilawan resin itself is obtained by heating bhilawan shell liquid in the presence of metals, selected from a class consisting of zinc, tin, lead and their alloys, as described in the Journal of Scientific and Industrial Research, vol. 1, No. 1, page 20, column 2, and in Indian patents, Nos. 28,002 to 28,005; 29,051 and 29,938. It is there shown that bhilawan resin is insoluble in alcohol but soluble in turpentine and hydrocarbons.

The leather finishes in vogue are essentially highly plasticised. On account of the high inherent flexibility of the oil resin in the compositions described in the present application, only a comparatively small quantity of plasticiser has to be used. Dibutyl phthalate and commercial castor oil have been chosen in consideration of their lower prices.

The essential details that have to be observed in the preparation of lacquers for first, second and third coatings are as follows:

The removal of the silver salts from the cinematographic films by means of a solution of quicklime and caustic soda forms the preliminary operation.

*First formula (for first coating)*

The oil resin (14 parts), film scraps (6 parts), butyl acetate (35 parts) and solvent naphtha (10 parts) are subjected to vigorous agitation in a shaking machine for 3 to 4 hours. When the resin and film scraps are well dispersed, the uniform paste is diluted with a mixture of butanol (15 parts), methanol (15 parts) and turpentine (10 parts) and again well shaken. The resulting solution is then filtered through a sieve (200 mesh). Finally, dibutyl phthalate (4 parts) is added and the whole mixed thoroughly.

*Second formula (for second coating)*

The oil resin (7 parts), film scraps (3 parts) and bhilawan enamel (5 parts), butyl acetate (35 parts) and solvent naphtha (10 parts) are kept in agitation in a shaking machine for 3 to 4 hours. When the resin, film scraps and enamel are well dispersed, the solution is diluted with a mixture of methanol (15 parts), butanol or fusel oil (15 parts) and turpentine (35 parts). The resulting solution is filtered through a 200 mesh sieve. Finally dibutyl phthalate (2 parts) and castor oil (5 parts) are added and well mixed.

*Third formula (for third coating)*

Film scraps (4 parts) are dissolved in a mixture of butyl acetate (27 parts), butanol or fusel oil (23 parts), methanol (15 parts), solvent naphtha (10 parts) and acetone (10 parts). In order to dissolve the films quickly the solution is kept in agitation in a shaking machine for 3 to 4 hours. The solution is filtered through a sieve (200 mesh). Finally dibutyl phthalate (2 parts) is added.

The coating compositions prepared as described above may be applied to leather (preferably chrome-tanned) in the manner widely known in the patent leather trade.

I claim:

1. A coating composition particularly adapted for use in producing a base coat in the manufacture of patent leather which comprises butyl acetate 35 parts, a solvent selected from a class consisting of butanol and fusel oil 15 parts, methanol 15 parts, solvent naphtha 10 parts, turpentine 10 parts, film scrap 6 parts, oil resin 14 parts and dibutyl phthalate; the major components of said composition being maintained within the range of from about 5 parts above to 5 parts below the specific proportions indicated the said oil resin being the product resulting from the copolymerization of bhilawan shell liquid with a vegetable oil and with an oleoresinous material, selected from a class consisting of rosin and turpentine, by treatment with nitric acid at a temperature of from about 40° to 50° C.

2. A patent leather comprising a base of chrome-tanned leather coated with a composite coating comprising the dried and hardened residues of the following three coating compositions applied in the sequence indicated: a first composition comprising butyl acetate 35 parts, a solvent selected from a class consisting of butanol and fusel oil 15 parts, methanol 15 parts, solvent naphtha 10 parts, turpentine 10 parts, film scrap 6 parts, oil resin 14 parts and dibutyl phthalate 4 parts; a second composition comprising butyl acetate 35 parts, a solvent selected from a class consisting of butanol and fusel oil 15 parts, methanol 15 parts, solvent naphtha 10 parts, film scrap 3 parts, oil resin 7 parts, Bhilawan enamel 5 parts, dibutyl phthalate 2 parts, castor oil 5 parts; and a third composition comprising butyl acetate 27 parts, a solvent selected from a class consisting of butanol and fusel oil 23 parts, methanol 15 parts, solvent naphtha 10 parts, acetone 10 parts, film scrap 4 parts and dibutyl phthalate 2 parts; the major components of the three compositions being maintained within the range of from about 5 parts above to 5 parts below the specific proportions set out the said oil resin being the product resulting from the copolymerization of bhilawan shell liquid with a vegetable oil and with an oleoresinous material, selected from a class consisting of rosin and turpentine, by treatment with nitric acid at a temperature of from about 40° to 50° C.

SALIMUZZAMAN SIDDIQUI.
DIGISH CHANDRA DHAR.

References Cited in the file of this patent

UNITED STATES PATENTS

| Number | Name | Date |
|---|---|---|
| 1,838,618 | Griffiths | Dec. 29, 1931 |
| 2,046,944 | Hall | July 7, 1936 |
| 2,111,461 | Shankweiler | Mar. 15, 1938 |
| 2,123,249 | Moss | July 12, 1938 |
| 2,143,618 | Booty et al. | Jan. 10, 1939 |
| 2,168,040 | Nebel | Aug. 1, 1939 |
| 2,181,609 | Russell | Nov. 28, 1939 |
| 2,263,526 | Thinius | Nov. 18, 1941 |
| 2,306,570 | Scripture | Dec. 29, 1942 |

FOREIGN PATENTS

| Number | Country | Date |
|---|---|---|
| 1,208 | Great Britain | 1871 |